United States Patent Office 3,470,272
Patented Sept. 30, 1969

3,470,272
PROCESS FOR MAKING PHOSPHOROTHIOATES
Thomas M. Melton, Richmond, Va., assignor to Mobil Oil Corporation, a corporation of New York
No Drawing. Filed Oct. 24, 1966, Ser. No. 588,731
Int. Cl. C07f 9/16; A01n 9/36
U.S. Cl. 260—978     6 Claims

ABSTRACT OF THE DISCLOSURE

Phosphorothioates such as malathion are prepared rapidly by reacting maleic anhydride with phosphorodithioic acids and alkanols.

---

This invention relates to the production of phosphorothioates useful as broad spectrum insecticides. In particular, the invention relates to the production of malathion and related phosphorus compounds. More particularly, it relates to an improved process for producing phosphorothioates of the general formula

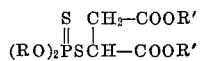

wherein R and R′ are lower alkyls containing from 1 to 6 carbon atoms.

Malathion has been widely accepted for application to many different kinds of pests. In view of this, and further in view of the fact that its use continues to grow, there is a need in the industry for a process which is adaptable to continuous operation. Prior art processes do not, so far as has been determined, fill this need.

U.S. Patent 2,578,652 discloses a process for making malathion and related compounds which comprises reacting a dithioic acid with maleate and fumarate esters. One disadvantage of this process is to be found in the use of the relatively expensive esters. Another disadvantage is the time required to complete the process. The process disclosed in 2,578,652 for making malathion and members closely related thereto requires from about 16 to about 24 hours to complete. As is apparent from this feature of the art process, it is not readily adaptable to the continuous production of desired product.

It is thus one object of the invention to provide a new process for producing the subject chemicals. It is a further object to provide a process for producing malathion and related compounds which is suited for use in a continuous operation. It is still another object to provide an economic process by employing less expensive starting materials.

In accomplishing the above objects, malathion and its relatives are produced by reacting maleic anhydride with an alkanol of the formula R′OH, wherein R′ has the same meaning as above, and a phosphorodithioic acid of the formula $$(RO)_2P(S)SH$$

wherein R has the same meaning as above.

Studies made of the reaction between these materials show that the mechanism involves, first, a reaction of one equivalent of alkanol with the maleic anhydride to break the anhydride bond thereof. This is shown by the equation:

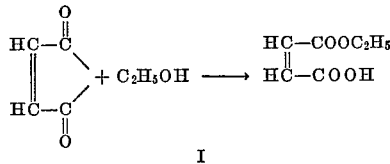

I

This initial reaction proceeds at a fast rate, and is complete within two to three minutes. In the second step, the monoester of maleic acid adds to the dithioic acid, thusly:

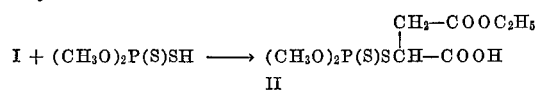

II

The second step is moderately fast, requiring approximately 30 minutes for completion. The third and final step is the slowest, and involves a normal esterification reaction, with the elimination of water. This reaction, which requires from two to three hours, is shown by the equation:

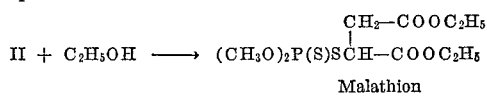

Malathion

It was surprising, in view of the extended periods required for the reaction between diethyl maleate and dimethyl phosphorodithioic acid, to find that the method of the invention produced malathion in the short period mentioned.

In one aspect, the invention may be practiced by mixing maleic anhydride and the appropriate phosphorodithioic acid, followed by the addition of alcohol thereto, and heating to complete the initial reactions. The alkanol may be added at room temperature over a short period of time, with slight cooling, if desired, to dissipate the mild heat generated by the initial reaction thereof with the anhydride, and of this product with the acid. After the exotherm subsides, indicating that these reactions are complete, benzene is added and the mixture is azeotroped until no further distillation of water occurs.

The invention is not limited to any particular order of bringing the active ingredients together, since it is contemplated that any convenient method will be within the scope thereof. For example, alkanol and acid can be mixed, followed by the addition of anhydride. In batch operations, only the alcohol may be placed in the reactor, with subsequent addition thereto of the anhydride, and of the dithioic acid following completion of the reaction between alkanol and anhydride. In continuous operations, after mixing the anhydride, alkanol and dithioic acid, and establishing product conditions, separate streams of the three reactants may be added to the product mass at a rate which will ensure removal of substantially all product at the product discharge end. The separate reactant streams may contain (1) alkanol and (2) acid plus anhydride, respectively, or (1) anhydride and (2) acid plus alkanol, respectively. Obviously, it may not be possible to have alkanol and anhydride as members of the same stream because of the ease with which these two interact.

The equations outlining the apparent mechanism for the reaction taking place show the use of equivalent quantities of alcohol with anhydride. It will be understood that this represents only one way of bringing the reactants together. Instead of using only one half the alcohol in the initial reactions (between (1) alcohol and anhydride and between (2) the product of (1) with the acid) and then adding the other one half for esterification, all of the alcohol, preferably an excess, may be added initially. This will in no way interfere with the overall scheme, since following the anhydride bond rupture no appreciable further reaction involving alcohol will take place until after the acid-maleic half-ester reaction is complete. There is no need to mention other methods of bringing the reactants together. Suffice it to say that any method which accomplishes this will be within the spirit and scope of the invention.

Although it is preferable to begin the reaction at or near room temperature when adding alkanol to a mixture of the remaining reactants, or when adding anhydride to a mixture containing acid and alkanol, the temperatures at which the initial reactions may be carried out are not limited thereto. The temperature, of course, will be governed to a large extent by the reactivity of the alkanol with respect to the anhydride, and the speed at which the half-ester adds to the acid, but it is contemplated that a range of fror about 10° to about 70° C. will be useful. At the lower temperatures these reactions may require longer times, and at the higher temperatures some cooling may be needed, but within this range the preferred temperatures are from about 50° to about 60° C.

In the above, and in the example which appears hereinafter, benzene was used as the solvent. Other inert organic solvents which form azeotropes with water, which do not have boiling points high enough to cause decomposition of the product, and which are easily separated therefrom may be used. These include toluene, xylene, ethylene chloride, propylene chloride, ethyl propyl ether, diisobutyl ether, ethyl acetate, propyl acetate, methyl propionate, ethyl propionate, methyl ethyl ketone, and ethyl cellosolve.

The following example will illustrate the inventive process. It will be understood that it is for the purpose of illustration only, and is intended in no way to limit the scope of the invention as defined hereinabove.

EXAMPLE

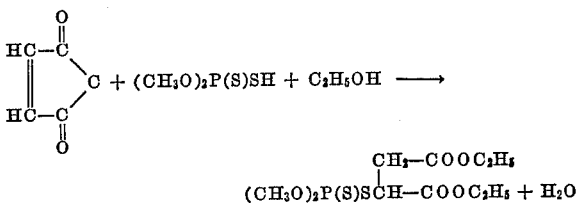

A mixture of 31.7 parts by weight (0.2 mole) of dimethyl phosphorodithioic acid and 19.6 parts by weight (0.2 mole) of maleic anhydride were mixed, at room temperature, in a 250 ml. 4-neck flask equipped with a stirrer, thermometer, and addition funnel. There was added with stirring 36.8 parts by weight (0.8 mole) of ethyl alcohol over a period of about five minutes. There was a mild exotherm, and the temperature increased to 50° C. A yellow color formed in the reaction mixture, which disappeared after the exotherm subsided in two to three minutes.

The system was rearranged for azeotropic distillation, and about 90 parts by weight of benzene were added. The mixture was thereupon refluxed until no further distillation of water occurred. The benzene was removed by distillation, the final temperature and pressure being 60° C. and 30 mm. of Hg, respectively. A quantitative yield of crude product was obtained which was about 75% pure malathion having a refractive index at 25° C. of 1.4970 and a phosphorus content of 9.54% (theory, 9.36%).

Among other related products which may be prepared by the above process are S-(1,2-dicarbomethoxyethyl) O,O-dimethyl phosphorodithioate, S-(1,2 - dicarbopropoxyethyl) O,O-dimethyl phosphorodithioate, S-(1,2-dicarbobutoxyethyl) O,O-dipropyl phosphorodithioate, S-(1,2-dicarbohexoxyethyl) O,O-dibutyl phosphorodithioate, and S-(1,2-dicarboethoxyethyl) O,O-dihexyl phosphorodithioate.

I claim:
1. The process for the manufacture of a phosphorodithioate of the formula

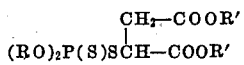

wherein R and R' are alkyls containing from one to six carbon atoms wherein maleic anhydride is reacted with an alkanol of the formula

wherein R' is as hereinbefore defined, and a phosphorodithioic acid of the formula

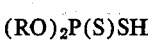

wherein R is as hereinbefore defined, which comprises the steps of forming a mixture consisting essentially of said maleic anhydride and phosphorodithioic acid, adding said alkanol thereto and then treating the resulting mixture at a temperature of from about 10° C. to about 70° C. to form a compound of the formula

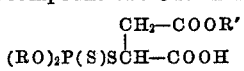

adding an inert organic solvent which will form an azeotropic mixture with water, and heating under azeotropic conditions to complete esterification of the compound obtained in the steps prior to solvent addition, the time for the manufacture being up to about 3 hours.

2. The process of claim 1 wherein the temperature is from about 50° C. to about 60° C.

3. The process of claim 1 wherein the inert organic solvent is benzene.

4. The process of claim 1 wherein about one molar proportion of maleic anhydride and about one molar proportion of the phosphorodithioic acid are so reacted with a stoichiometric excess of the alkanol.

5. The process of claim 1 wherein about one molar proportion of maleic anhydride and about one molar proportion of the phosphorodithioic acid are so reacted with about four molar proportions of the alkanol.

6. The process of claim 1 wherein the phosphorodithioic acid is dimethyl phosphorodithioic acid and the alkanol is ethyl alcohol.

References Cited

UNITED STATES PATENTS 2,091,241   8/1937   Kvalnes _____ 260—485 XR
2,578,652  12/1951   Cassaday _____ 260—978 XR CHARLES B. PARKER, Primary Examiner ANTON H. SUTTO, Assistant Examiner U.S. Cl. X.R.

260—942, 999

UNITED STATES PATENT OFFICE
CERTIFICATE OF CORRECTION

Patent No. 3,470,272        Dated September 30, 1969

Inventor(s) Thomas M. Melton

It is certified that error appears in the above-identified patent and that said Letters Patent are hereby corrected as shown below:

Column 1, line 68, change formula to read

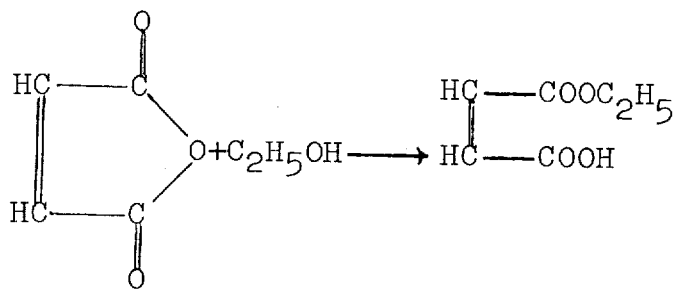

Column 3, line 9, delete "fror" and insert --from--. Column 3 line 33, change formula to read (in part)

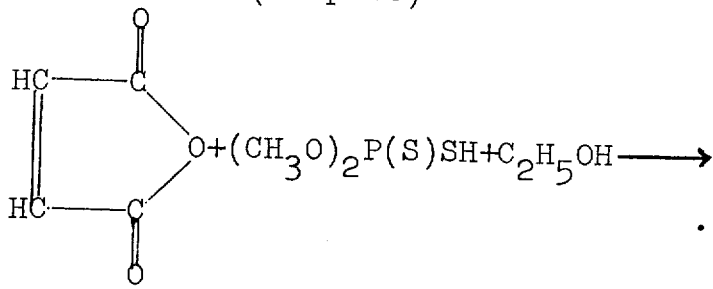

Column 3,

Column 3, lines 58-59, delete "theory, 9.36%" and insert --theory - 9.36%--.

SIGNED AND SEALED

MAY 26 1970

(SEAL)
Attest:

Edward M. Fletcher, Jr.
Attesting Officer

WILLIAM E. SCHUYLER, JR.
Commissioner of Patents